US012804472B2

(12) United States Patent
Huang

(10) Patent No.: US 12,804,472 B2
(45) Date of Patent: Nov. 17, 2026

(54) CONTROL METHOD OF WIRELESS COMMUNICATION MODULE USING PACKET MARKS FOR TRANSMISSION RATE DETERMINATION

(71) Applicant: MEDIATEK INC., Hsin-Chu (TW)

(72) Inventor: Chi-Han Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 122 days.

(21) Appl. No.: 18/381,166

(22) Filed: Oct. 17, 2023

(65) Prior Publication Data

US 2024/0163732 A1 May 16, 2024

Related U.S. Application Data

(60) Provisional application No. 63/383,105, filed on Nov. 10, 2022.

(51) Int. Cl.
*H04L 1/00* (2006.01)
*H04L 5/00* (2006.01)
(Continued)

(52) U.S. Cl.
CPC ........... *H04W 28/22* (2013.01); *H04L 1/0002* (2013.01); *H04L 5/0048* (2013.01); *H04L 47/10* (2013.01);
(Continued)

(58) Field of Classification Search
CPC ............. H04W 28/22; H04W 72/1273; H04W 52/26; H04L 5/0048; H04L 65/70;
(Continued)

(56) References Cited

U.S. PATENT DOCUMENTS

2005/0238016 A1* 10/2005 Nishibayashi ........ H04L 1/1614 370/389
2014/0269964 A1* 9/2014 Du ........................ H04L 1/1685 375/267
2015/0146700 A1* 5/2015 Wentink ................ H04L 1/0057 370/336

(Continued)

FOREIGN PATENT DOCUMENTS

CN 114650564 * 6/2022 ............ H04W 28/22
WO WO-2005039119 A1 * 4/2005 ............. H04L 29/06

OTHER PUBLICATIONS

David Coleman, 802.11ax Frame Aggregation Enhancements, Extreme Networks (Dec. 27, 2020), https://www.extremenetworks.com/resources/blogs/802-dot-11ax-frame-aggregation-enhancements (Year: 2020).*

Mosleh Abualhaj, Survey and Analysis of VoIP Frame Aggregation Methods over A-MSDU IEEE 802.11n Wireless Networks, Tech Science Press (Jan. 2021) (Year: 2021).*

(Continued)

*Primary Examiner* — Salvador E Rivas
(74) *Attorney, Agent, or Firm* — Winston Hsu

(57) ABSTRACT

The present invention provides a control method of a wireless communication module, wherein the control method includes the steps of: obtaining a plurality of media access control protocol data units (MPDUs), wherein each MPDU comprises a packet mark; aggregating the plurality of MPDUs to generate a physical layer protocol data unit (PPDU); and determining a final transmission rate setting according to statistics of the packet marks of the plurality of MPDUs, wherein the final transmission rate setting is used for a wireless transmission of the PPDU.

18 Claims, 5 Drawing Sheets

(51) Int. Cl.

| | |
|---|---|
| ***H04L 9/40*** | (2022.01) |
| ***H04L 47/10*** | (2022.01) |
| ***H04W 28/22*** | (2009.01) |
| ***H04W 52/26*** | (2009.01) |
| ***H04W 72/1273*** | (2023.01) |
| *H04L 65/75* | (2022.01) |
| *H04L 69/322* | (2022.01) |

(52) U.S. Cl.
CPC ......... *H04L 63/0876* (2013.01); *H04W 52/26* (2013.01); *H04W 72/1273* (2013.01); *H04L 65/75* (2022.05); *H04L 69/322* (2013.01)

(58) Field of Classification Search
CPC ............... H04L 65/762; H04L 63/0876; H04L 69/322; H04L 47/10; H04L 1/0002; H04L 12/4645
See application file for complete search history.

(56) References Cited

U.S. PATENT DOCUMENTS

| | | | | |
|---|---|---|---|---|
| 2016/0269932 | A1* | 9/2016 | Nemavat | H04W 28/0231 |
| 2017/0272980 | A1* | 9/2017 | Lin | H04L 47/25 |
| 2018/0234320 | A1* | 8/2018 | Paulraj | H04L 47/25 |
| 2020/0396695 | A1* | 12/2020 | Bhushan | H04B 17/336 |
| 2021/0076251 | A1* | 3/2021 | Ho | H04L 1/1614 |
| 2022/0279602 | A1* | 9/2022 | Xue | H04L 65/80 |
| 2022/0304000 | A1* | 9/2022 | Wang | H04L 47/24 |
| 2022/0416964 | A1* | 12/2022 | Fang | H04L 5/0064 |

OTHER PUBLICATIONS

A. M. Ahmed, A. Patel and M. Z. A. Khan, "Super-MAC: Data Duplication and Combining for Reliability Enhancements in Next-Generation Networks," in IEEE Access, vol. 9, pp. 54671-54689, 2021, doi: 10.1109/ACCESS.2021.3070993. (Year: 2021).*

* cited by examiner

CONTROL METHOD OF WIRELESS COMMUNICATION MODULE USING PACKET MARKS FOR TRANSMISSION RATE DETERMINATION

CROSS REFERENCE TO RELATED APPLICATIONS

This application claims the benefit of U.S. Provisional Application No. 63/383,105, filed on Nov. 10, 2022. The content of the application is incorporated herein by reference.

BACKGROUND

In a current wireless communication module, a receiver address/traffic identifier (RA/TID) queue is not flow-based, and one queue may contain multiple types of traffic streams, wherein each traffic stream may have different reliability and latency requirements. For example, a plurality of media access control protocol data units (MPDUs) included within a physical layer protocol data unit (PPDU) may comprise file transfer traffic streams and live video traffic streams. The current transmission rate of the MPDUs is fixed with PPDU, wherein the higher transmission rate usually means higher throughput and lower reliability (i.e. higher packer error rate), and the lower transmission rate usually means lower throughput and higher reliability. In addition, the transmission rate adaptation is quasi-static during a transmission opportunity (TXOP) or during a long period, so if the transmission rate is controlled to be lower to increase the reliability, the long-term throughput is degraded.

In addition, in a receiver side, a reordering procedure is performed before pushing the packets to applications, that is the corrupted former packets may gate the later packets. Therefore, if the data transmission has higher packet error rates, the receiver needs to buffer many packets and waits the packet retransmission of the former loss packets.

SUMMARY

It is therefore an objective of the present invention to provide a control method of a wireless communication module, which can determine a transmission rate setting of each PPDU according to information of the MPDUs, to solve the above-mentioned problems.

According to one embodiment of the present invention, a control method of a wireless communication module includes the steps of: obtaining a plurality of media access control protocol data units (MPDUs), wherein each MPDU comprises a packet mark or a transmission descriptor with a packet mark; aggregating the plurality of MPDUs to generate a physical layer protocol data unit (PPDU); and determining a final transmission rate setting according to statistics of the packet marks of the plurality of MPDUs, wherein the final transmission rate setting is used for a wireless transmission of the PPDU.

According to one embodiment of the present invention, a wireless communication module of an electronic device is configured to perform the steps of: obtaining a plurality of media access control protocol data units (MPDUs), wherein each MPDU comprises a packet mark or a transmission descriptor with a packet mark; aggregating the plurality of MPDUs to generate a physical layer protocol data unit (PPDU); and determining a final transmission rate setting according to statistics of the packet marks of the plurality of MPDUs, wherein the final transmission rate setting is used for a wireless transmission of the PPDU.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
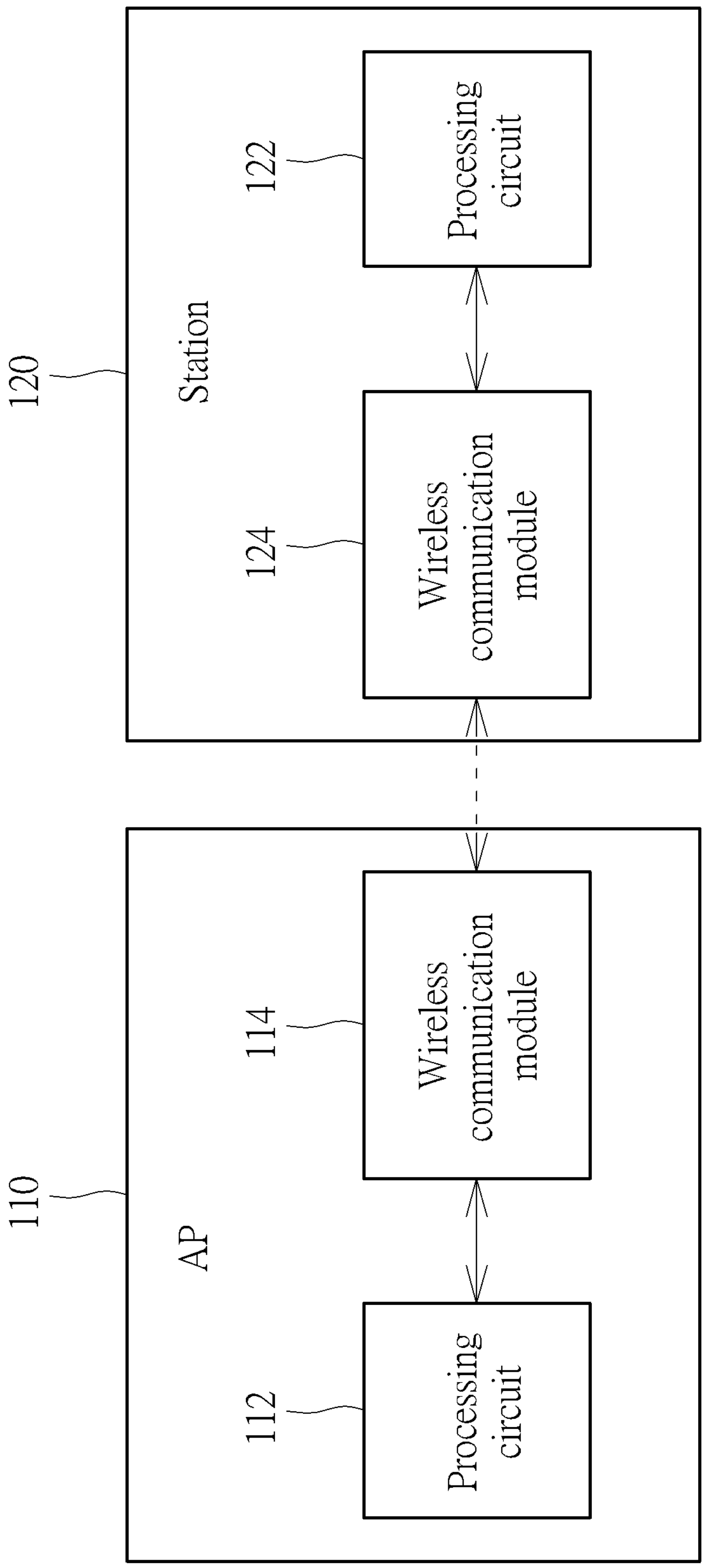
FIG. 1 is a diagram illustrating a wireless communication system according to one embodiment of the present invention.

FIG. 1 is a diagram illustrating a wireless communication system according to one embodiment of the present invention. As shown in FIG. 1, the wireless communication system comprises an access point (AP) 110 and at least one station such as 120. The AP 110 is a Wi-Fi access point (AP) that allows other wireless devices such as the station 120 to connect to a wired network, and the AP 110 mainly comprises a processing circuit 112 and a wireless communication module 114. The station 120 is a Wi-Fi station comprising a processing circuit 122 and a wireless communication module 124, and the station 120 can be a cell phone, a tablet, a notebook, or any other electronic device capable of wirelessly communicating with the AP 110. In addition, the wireless communication module 114/124 comprises at least a media address control (MAC) layer circuitry and physical layer circuitry.

Figure 2:
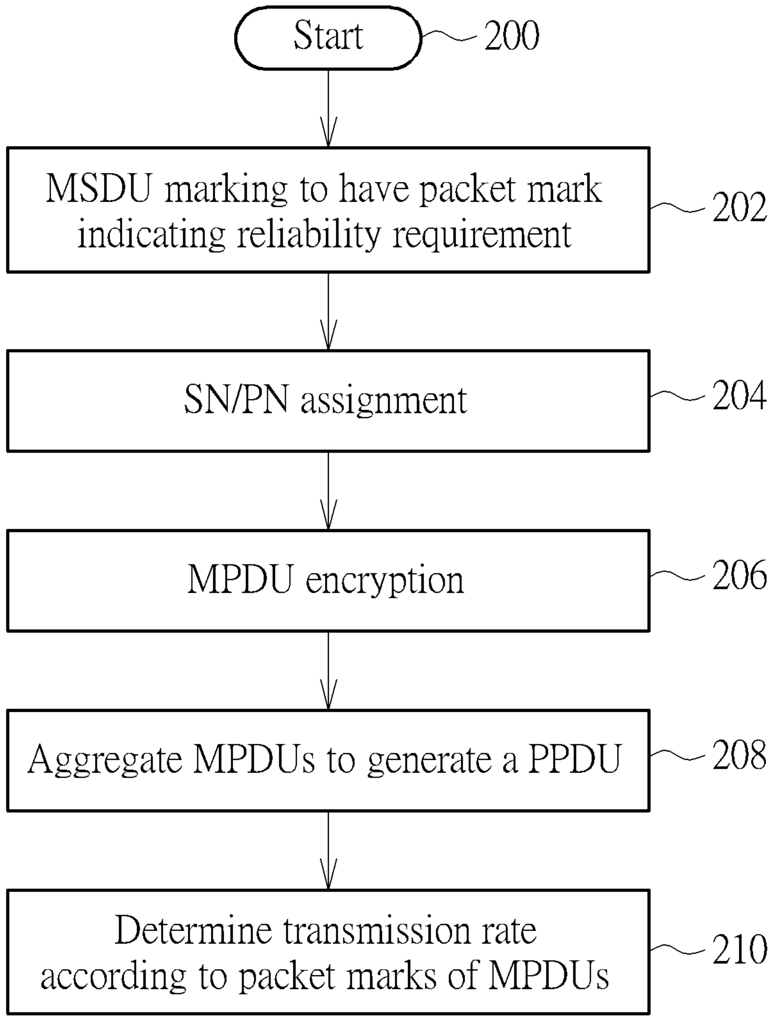
FIG. 2 is a control method of a wireless communication module according to one embodiment of the present invention.

FIG. 2 is a control method of one of the wireless communication modules 114 and 124 according to one embodiment of the present invention. In the following description, the wireless communication module 114 serves as an example to perform the following steps, but the present invention is not limited thereto. In Step 200, the flow starts, and the AP 110 and the station 120 has established one or more links. In Step 202, the wireless communication module 114 obtains a plurality of MAC service data units (MSDUs) and the wireless communication module 114 analyzes a type of each MSDU to determine a reliability requirement of each MSDU, and further adds a packet mark into the MSDU or into the transmission descriptor of the MSDU, wherein the added packet mark represents the reliability requirement of the MSDU. For example, if the MSDU belongs to a latency-sensitive packet (i.e., higher reliability requirement) such as voice over internet protocol (VoIP) signaling and data packet, gaming control and data packet, multimedia streaming packet, multimedia conferencing packet, real-time interactive packet, high priority packet, etc., the wireless communication module 114 can add a first packet mark into this MSDU. In addition, if the MSDU does not belong to the latency-sensitive packet (i.e., lower reliability requirement), such as a file transfer protocol (FTP) packet or a browser control and data packet, the wireless communication module 114 can add a second packet mark into this MSDU.

It is noted that the above using the first packet mark and the second packet mark to represent the reliability requirements is for illustrative, not a limitation of the present invention. In other embodiments, the reliability requirement can be classified into more than two degrees, and each degree corresponds to one packet mark. Specifically, if the MSDU belongs to a first degree of reliability requirement, the wireless communication module 114 adds a first packet mark into the MSDU; if the MSDU belongs to a second degree of reliability requirement, the wireless communication module 114 adds a second packet mark into the MSDU; if the MSDU belongs to a third degree of reliability requirement, the wireless communication module 114 adds a third packet mark into the MSDU, and so on.

Figure 3:
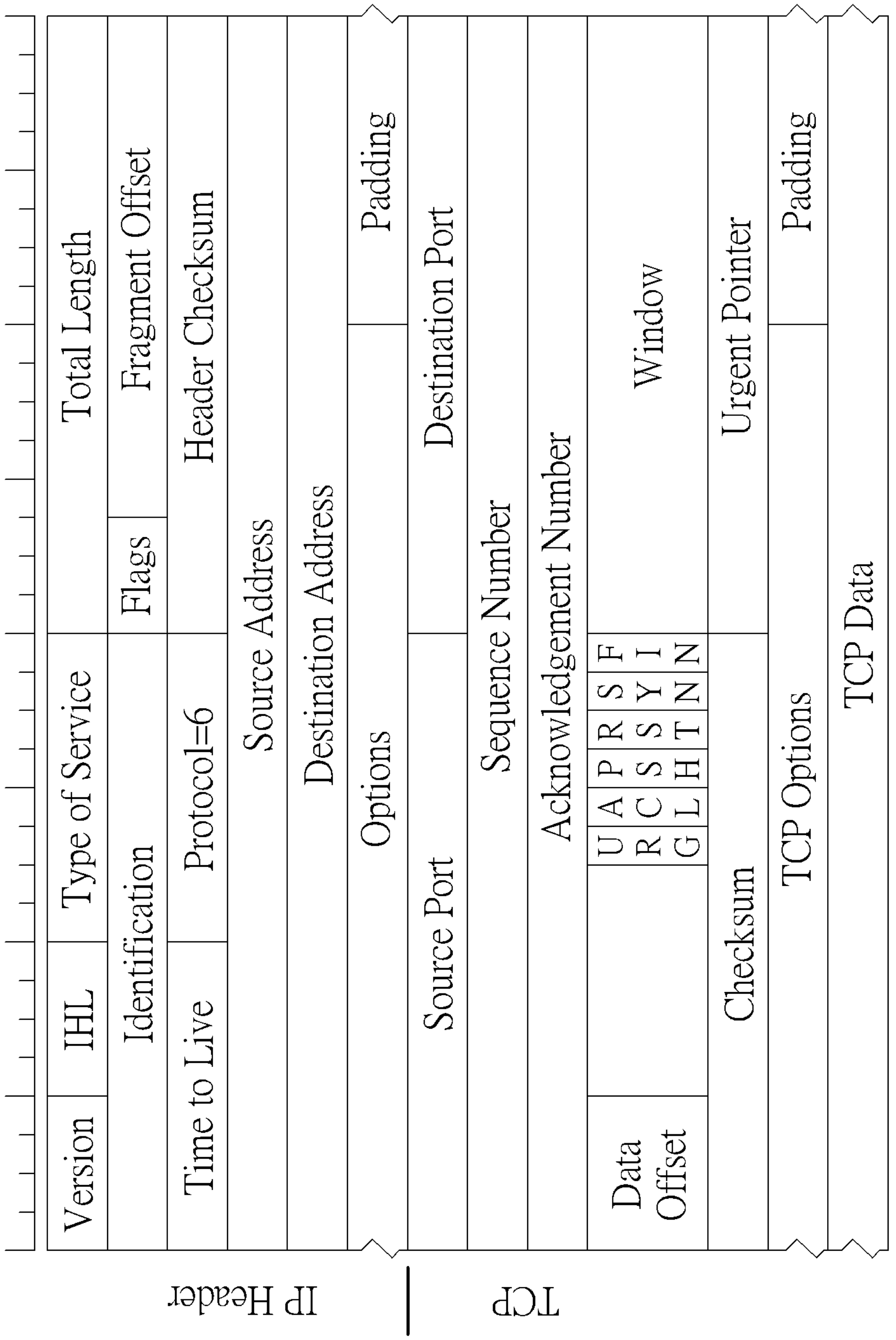
FIG. 3 shows a TCP/IP header.

The wireless communication module 114 can add the packet mark into any suitable location of MSDU. FIG. 3 shows a transmission control protocol/internet protocol (TCP/IP) header included in the MSDU. It is noted that conventional contents of the fields of the TCP/IP header are known by a person skilled in the art, so the details of these fields are omitted here. In one embodiment, the wireless communication module 114 can add the packet mark into the transmission descriptor of the MSDU by analyzing part of the 5-tuple (i.e., protocol field, source address field, destination address field, source port field, destination port field of the TCP/IP header) or TCP/IP data. In another embodiment, the wireless communication module 114 can add the packet mark into the options field of the TCP/IP header, for example, a part of the options field is set to "0" to represent the lower reliability requirement, and the part of the options field is set to "1" to represent the higher reliability requirement. In another embodiment, the wireless communication module 114 can add the packet mark into the TCP data. In another embodiment, the wireless communication module 114 can add the packet mark into the Wi-Fi MAC header or PHY preamble.

In Step 204, the wireless communication module 114 performs sequence number (SN) and packet number (PN) assignment for the each MPDU, and MDPUs are generated according to the MSDUs, wherein one MPDU may comprise one or more MSDUs. In Step 206, an encryption operation is performed on the MPDUs. In Step 208, a MAC layer circuit within the wireless communication module 114 aggregates a plurality of MPDUs to generate a PPDU. It is noted that Steps 204-208 are known by a person skilled in the art, so the detailed operations of MPDU generation and PPDU generation are omitted here.

Figure 4:
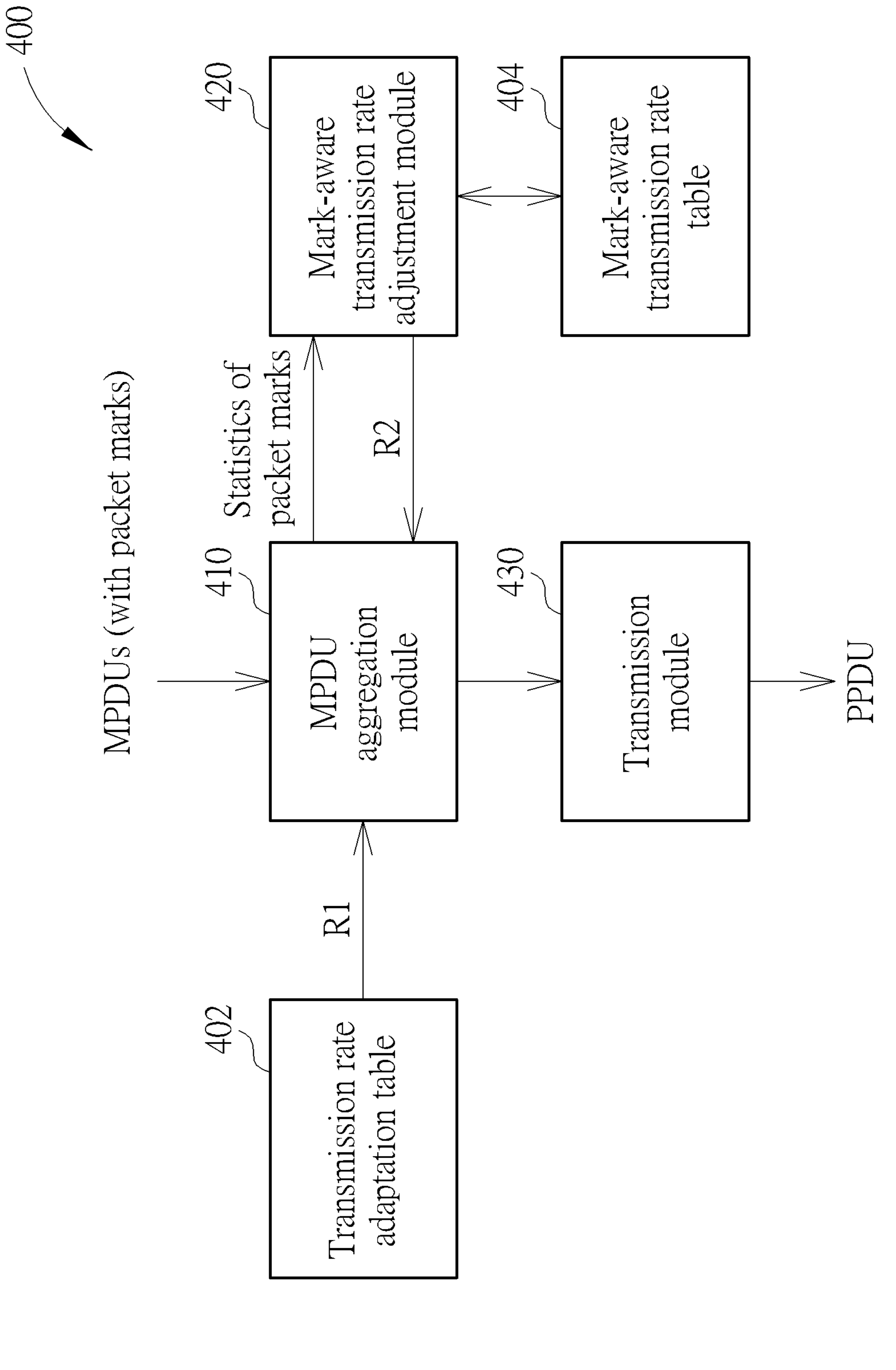
FIG. 4 is a diagram illustrating a MAC layer circuitry according to a first embodiment of the present invention.

In Step 210, the wireless communication module 114 determines a transmission rate setting of the PPDU according to at least a plurality packet marks of the MSDUs/MPDUs within the PPDU. In one embodiment, if the MPDU comprises two or more MSDUs, one of the packet marks of the MSDUs serves as the packet mark of the MPDU. FIG. 4 is a diagram illustrating a MAC layer circuitry 400 according to one embodiment of the present invention. As shown in FIG. 4, the MAC layer circuitry 400 comprises a MPDU aggregation module 410, a mark-aware transmission rate adjustment module 420, a transmission module 430, a transmission rate adaptation table 402 and a mark-aware transmission rate table 404. In the operation of the MAC layer circuitry 400, the MPDU aggregation module 410 receives the MPDUs from the previous stage of the MAC layer circuitry 400, and analyzes the MPDUs to determine statistics of the packet marks of these MPDUs, wherein the MPDUs are used form a single PPDU. In addition, the MPDU aggregation module 410 receives a first transmission rate setting R1 by referring to the transmission rate adaptation table 402, wherein the first transmission rate setting R1 may include but not limited to a modulation coding scheme (MCS) index, a bandwidth and/or a number of spatial streams (NSS), wherein the MCS index is a metric based on several parameters such as modulation type, the coding rate, NSS, the channel width, and/or the guard interval.

Then, the MPDU aggregation module 410 provides the first transmission rate setting R1, the statistics of packet marks of the MPDUs, and any other parameters that may affect the packet latency/reliability, to the mark-aware transmission rate adjustment module 420. In one embodiment, the mark-aware transmission rate adjustment module may obtain an air status from the MPDU aggregation module 410 or other circuit module, wherein the air status may include but not limited to a load of current overlapping basic service set (OBSS), a transmission power of the wireless communication module 114, and/or an expected receiver gain of a peer device.

The mark-aware transmission rate adjustment module 420 generates a second transmission rate setting R2 according to the statistics of the packet marks of the MPDUs, and at least a portion of the first transmission rate setting R1, the air status and the mark-aware transmission rate table 404. Specifically, the statistics of the packet marks of the MPDUs may comprise, but not limited to, a distribution of values of the packet marks of the MPDUs, a count of MPDUs with packet mark indicating lower reliability requirement, a total bytes of MPDUs with packet mark indicating lower reliability requirement, a count of MPDUs with packet mark indicating higher reliability requirement, a total bytes of MPDUs with packet mark indicating higher reliability requirement, a ratio between the count of MPDUs with packet mark indicating higher reliability requirement and the count of MPDUs with packet mark indicating lower reliability requirement, a ratio between the total bytes of MPDUs with packet mark indicating higher reliability requirement and the total bytes of MPDUs with packet mark indicating lower reliability requirement, etc. In one embodiment, if the count of MPDUs with packet mark indicating higher reliability requirement is greater than a threshold value, or the total bytes of MPDUs with packet mark indicating higher reliability requirement is greater than a threshold value, or the ratio of the count of MPDUs with packet mark indicating higher reliability requirement to the count of MPDUs with packet mark indicating lower reliability requirement is greater than a threshold value, or the ratio of the total bytes of MPDUs with packet mark indicating higher reliability requirement to the total bytes of MPDUs with packet mark indicating lower reliability requirement is greater than a threshold value, the mark-aware transmission rate adjustment module 420 determines that the PPDU including these MPDUs should have higher reliability and lower packet error rate, so the second transmission rate setting R2 is determined to be more reliable than the first transmission rate setting; otherwise, the second transmission rate setting R2 is determined to be equal to the first transmission rate setting. In one embodiment, the mark-aware transmission rate table 404 can record any suitable transmission rate settings and corresponding packet error rates, wherein the transmission rate settings are parameters that may influence the packet error rates. In this embodiment, the mark-aware transmission rate table 404 records a plurality of MCS indexes and corresponding packet error rates, for example, MCS index "7" corresponds to packet peer rate "10%", MCS index "6" corresponds to packet peer rate "8%", MCS index "5" corresponds to packet peer rate "6%", and so on, and the mark-aware transmission rate adjustment module 420 can determine the suitable packet error rate according to the statistics of the packet marks of the MPDUs, and determine the second transmission rate setting R2 (e.g., MCS index) according to the suitable packet error rate.

Then, the mark-aware transmission rate adjustment module 420 sends the second transmission rate setting R2 to the MPDU aggregation module 410, and the MPDU aggregation module 410 determines a final transmission rate setting according to at least the second transmission rate setting R2. In one embodiment, the MPDU aggregation module 410 may directly use the second transmission rate setting R2 as the final transmission rate setting. In another embodiment, the MPDU aggregation module 410 may generate the final transmission rate setting according both the first transmission rate setting R1 and the second transmission rate setting R2. Then, the MPDU aggregation module 410 generates the PPDU and the associated final transmission rate information to the transmission module 430, for the transmission module 430 provides the PPDU and the associated final transmission rate information to the following stage of the wireless communication module 114.

Figure 5:
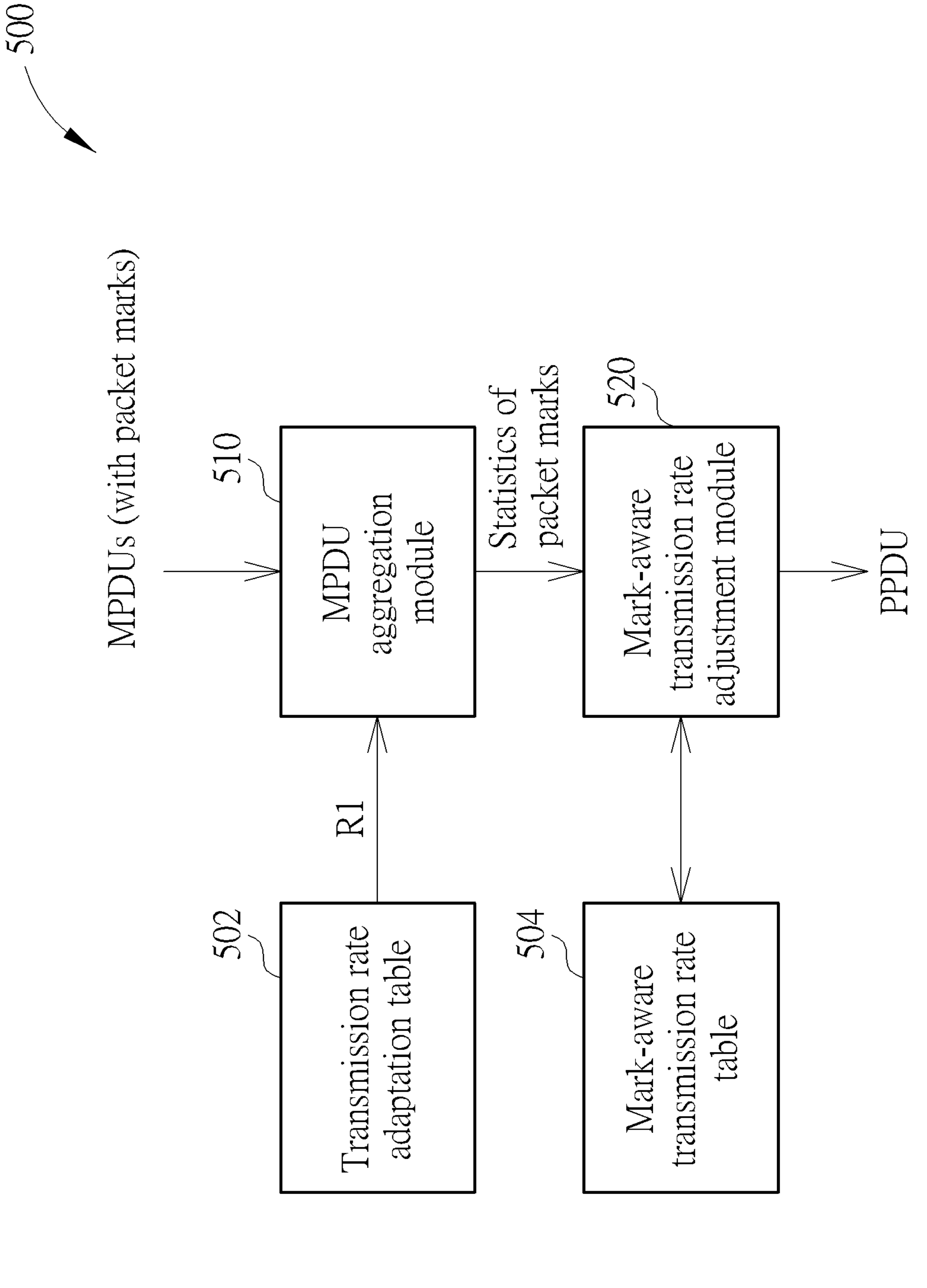
FIG. 5 is a diagram illustrating a MAC layer circuitry according to a second embodiment of the present invention.

FIG. 5 is a diagram illustrating a MAC layer circuitry 500 according to one embodiment of the present invention. As shown in FIG. 5, the MAC layer circuitry 500 comprises a MPDU aggregation module 510, a mark-aware transmission rate adjustment module 520, a transmission rate adaptation table 502 and a mark-aware transmission rate table 504. In the operation of the MAC layer circuitry 500, the MPDU aggregation module 510 receives the MPDUs from the previous stage of the MAC layer circuitry 500, and analyzes the MPDUs to determine statistics of the packet marks of these MPDUs, wherein the MPDUs are used form a single PPDU. In addition, the MPDU aggregation module 510 receives a first transmission rate setting R1 by referring to the transmission rate adaptation table 502, wherein the first transmission rate setting R1 may include but not limited to a MCS index, a bandwidth and/or a NSS.

Then, the MPDU aggregation module 510 provides the first transmission rate setting R1, the statistics of packet marks of the MPDUs, and any other parameters that may affect the packet latency/reliability, to the mark-aware transmission rate adjustment module 520. In one embodiment, the mark-aware transmission rate adjustment module may obtain an air status from the MPDU aggregation module 510 or other circuit module, wherein the air status may include but not limited to a load of current OBSS, a transmission power of the wireless communication module 114, and/or an expected receiver gain of a peer device.

The mark-aware transmission rate adjustment module 520 generates a second transmission rate setting according to the statistics of the packet marks of the MPDUs, and at least a portion of the first transmission rate setting R1, the air status and the mark-aware transmission rate table 504, wherein the examples of the statistics of the packet marks of the MPDUs and the determination of the second transmission rate setting can refer to the embodiments shown in FIG. 4.

Then, the mark-aware transmission rate adjustment module 520 determines a final transmission rate setting according to at least the second transmission rate setting. In one embodiment, the mark-aware transmission rate adjustment module 520 may directly use the second transmission rate setting as the final transmission rate setting. In another embodiment, the mark-aware transmission rate adjustment module 520 may generate the final transmission rate according both the first transmission rate setting R1 and the second transmission rate setting. Then, the mark-aware transmission rate adjustment module 520 generates the PPDU and the associated final transmission rate information to the following stage of the wireless communication module 114.

It is noted that the circuit arrangements shown in FIG. 4 and FIG. 5 are for illustrative, not limitations of the present invention. As long as the final transmission rate setting of a PPDU is determined according to at least the statistics of packet marks of the MPDUs included in the PPDU, the related processing steps can be performed by different circuit module(s).

In light of above, in the control method of the present invention, by adding packet mark into the transmission descriptor of each MSDU/MPDU or a field of MSDU/MPDU to indicate its reliability requirement, when the MPDU aggregation is performed to generate a PPDU, the statistics of the packet marks of the MPDUs included in the PPDU can be analyzed to determine a suitable final transmission rate setting, for the wireless transmission of the PPDU. In addition, the control method shown in FIG. 4 or FIG. 5 is performed for each PPDU, so each PPDU can have its suitable transmission rate setting based on the reliability requirements of the internal MPDUs, therefore, the present invention can solve the problems caused by the conventional quasi-static transmission rate adaptation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a wireless communication module circuit, comprising:

obtaining a plurality of media access control protocol data units (MPDUs), wherein each MPDU comprises a packet mark or a transmission descriptor with the packet mark;

aggregating the plurality of MPDUs to generate a physical layer protocol data unit (PPDU); and determining a final transmission rate setting for the PPDU according to statistics of the packet marks of the aggregated plurality of MPDUs prior to a wireless transmission of the PPDU, wherein the final transmission rate setting is used for the wireless transmission of the PPDU.

2. The control method of claim 1, wherein for each MPDU: when the MPDU comprises voice over internet protocol (VOIP) signaling and data packets, gaming control and data packets, multimedia streaming packets, multimedia conferencing packet or real-time interactive packets, the MPDU has the packet mark with a first value; and when the MPDU comprise file transfer protocol (FTP) packets or a browser control and data packets, the MPDU has the packet mark with a second value.

3. The control method of claim 1, wherein the packet mark of the MPDU represents a reliability requirement of the MPDU.

4. The control method of claim 3, further comprising:
obtaining a plurality of media access control service data units (MSDUs);
analyzing a type of each MSDU to determine the reliability requirement of the MSDU to determine the corresponding packet mark, and adding the packet mark into the MSDU or the transmission descriptor of the MSDU; and
generating the plurality of MPDUs according to the plurality of MSDUs.

5. The control method of claim 3, wherein the step of determining the final transmission rate setting for the PPDU according to the statistics of the packet marks of the aggregated plurality of MPDUs prior to the wireless transmission of the PPDU comprises:
determining the final transmission rate setting according to a count of the MPDUs with the packet marks indicating a lower reliability requirement, total bytes of the MPDUs with the packet marks indicating the lower reliability requirement, a count of the MPDUs with the packet marks indicating a higher reliability requirement, total bytes of the MPDUs with the packet marks indicating the higher reliability requirement, a ratio of the count of the MPDUs with the packet marks indicating the higher reliability requirement to the count of the MPDUs with the packet marks indicating the lower reliability requirement, or a ratio of the total bytes of the MPDUs with the packet marks indicating the higher reliability requirement to the total bytes of the MPDUs with the packet marks indicating the lower reliability requirement.

6. The control method of claim 1, wherein the step of determining the final transmission rate setting for the PPDU according to the statistics of the packet marks of the aggregated plurality of MPDUs prior to the wireless transmission of the PPDU comprises:
determining a first transmission rate setting;
determining a second transmission rate setting according to the first transmission rate setting and the statistics of the packet marks of the plurality of MPDUs; and
determining the final transmission rate setting according to the second transmission rate setting.

7. The control method of claim 6, wherein the second transmission rate setting is more reliable than the first transmission rate setting.

8. The control method of claim 6, wherein the step of determining the second transmission rate setting according to the first transmission rate setting and the statistics of the packet marks of the plurality of MPDUs comprises:
determining the second transmission rate setting according to the first transmission rate setting, the statistics of the packet marks of the plurality of MPDUs and a mark-aware transmission rate table, wherein the mark-aware transmission rate table records a plurality of transmission rate settings and corresponding packet error rates.

9. The control method of claim 8, wherein the mark-aware transmission rate table records a plurality of modulation coding scheme (MCS) indexes and corresponding packet error rates.

10. A wireless communication module circuit of an electronic device, comprising:
a media access control protocol data units (MPDU) aggregation module circuit, configured to perform steps of:
obtaining a plurality of media access control protocol data units (MPDUs), wherein each MPDU comprises a packet mark or a transmission descriptor with the packet mark; and
aggregating the plurality of MPDUs to generate a physical layer protocol data unit (PPDU); and
a mark-aware transmission rate adjustment module circuit;
wherein the MPDU aggregation module circuit and/or the mark-aware transmission rate adjustment module circuit is configured to perform steps of: determining a final transmission rate setting for the PPDU according to statistics of the packet marks of the aggregated plurality of MPDUs prior to a wireless transmission of the PPDU, wherein the final transmission rate setting is used for the wireless transmission of the PPDU.

11. The wireless communication module circuit of claim 10, wherein for each MPDU, when the MPDU comprises voice over internet protocol (VOIP) signaling and data packets, gaming control and data packets, multimedia streaming packets, multimedia conferencing packets or real-time interactive packets, the MPDU has the packet mark with a first value; and when the MPDU comprises file transfer protocol (FTP) packets or browser control and data packets, the MPDU has the packet mark with a second value.

12. The wireless communication module circuit of claim 10, wherein the packet mark of the MPDU represents a reliability requirement of the MPDU.

13. The wireless communication module circuit of claim 12, further comprising:
obtaining a plurality of media access control service data units (MSDUs);
analyzing a type of each MSDU to determine the reliability requirement of the MSDU to determine the corresponding packet mark, and adding the packet mark into the MSDU or the transmission descriptor of the MSDU; and
generating the plurality of MPDUs according to the plurality of MSDUs.

14. The wireless communication module circuit of claim 12, wherein the step of determining the final transmission rate setting for the PPDU according to the statistics of the packet marks of the aggregated plurality of MPDUs prior to the wireless transmission of the PPDU comprises:
determining the final transmission rate setting according to a count of the MPDUs with the packet marks indicating a lower reliability requirement, total bytes of the MPDUs with the packet marks indicating the lower reliability requirement, a count of the MPDUs with the packet marks indicating a higher reliability requirement, total bytes of the MPDUs with the packet marks indicating the higher reliability requirement, a ratio of the count of the MPDUs with the packet marks indicating the higher reliability requirement to the count of the MPDUs with the packet marks indicating the lower reliability requirement, or a ratio of the total bytes of the MPDUs with the packet marks indicating the higher reliability requirement to the total bytes of the MPDUs with the packet marks indicating the lower reliability requirement.

15. The wireless communication module circuit of claim 10, wherein the step of determining the final transmission rate setting for the PPDU according to the statistics of the packet marks of the aggregated plurality of MPDUs performed by the MPDU aggregation module circuit and/or the mark-aware transmission rate adjustment module circuit comprises:

determining a first transmission rate setting;

determining a second transmission rate setting according to the first transmission rate setting and the statistics of the packet marks of the plurality of MPDUs; and determining the final transmission rate setting according to the second transmission rate setting.

16. The wireless communication module circuit of claim 15, wherein the second transmission rate setting is more reliable than the first transmission rate setting.

17. The wireless communication module circuit of claim 15, wherein the step of determining the second transmission rate setting according to the first transmission rate setting and the statistics of the packet marks of the plurality of MPDUs comprises:

determining the second transmission rate setting according to the first transmission rate setting, the statistics of the packet marks of the plurality of MPDUs and a mark-aware transmission rate table, wherein the mark-aware transmission rate table records a plurality of transmission rate settings and corresponding packet error rates.

18. The wireless communication module circuit of claim 17, wherein the mark-aware transmission rate table records a plurality of modulation coding scheme (MCS) indexes and corresponding packet error rates.

* * * * *